May 2, 1944.    P. W. THORNHILL    2,348,160
LIQUID DAMPED TELESCOPIC SHOCK ABSORBER
Filed Feb. 25, 1943
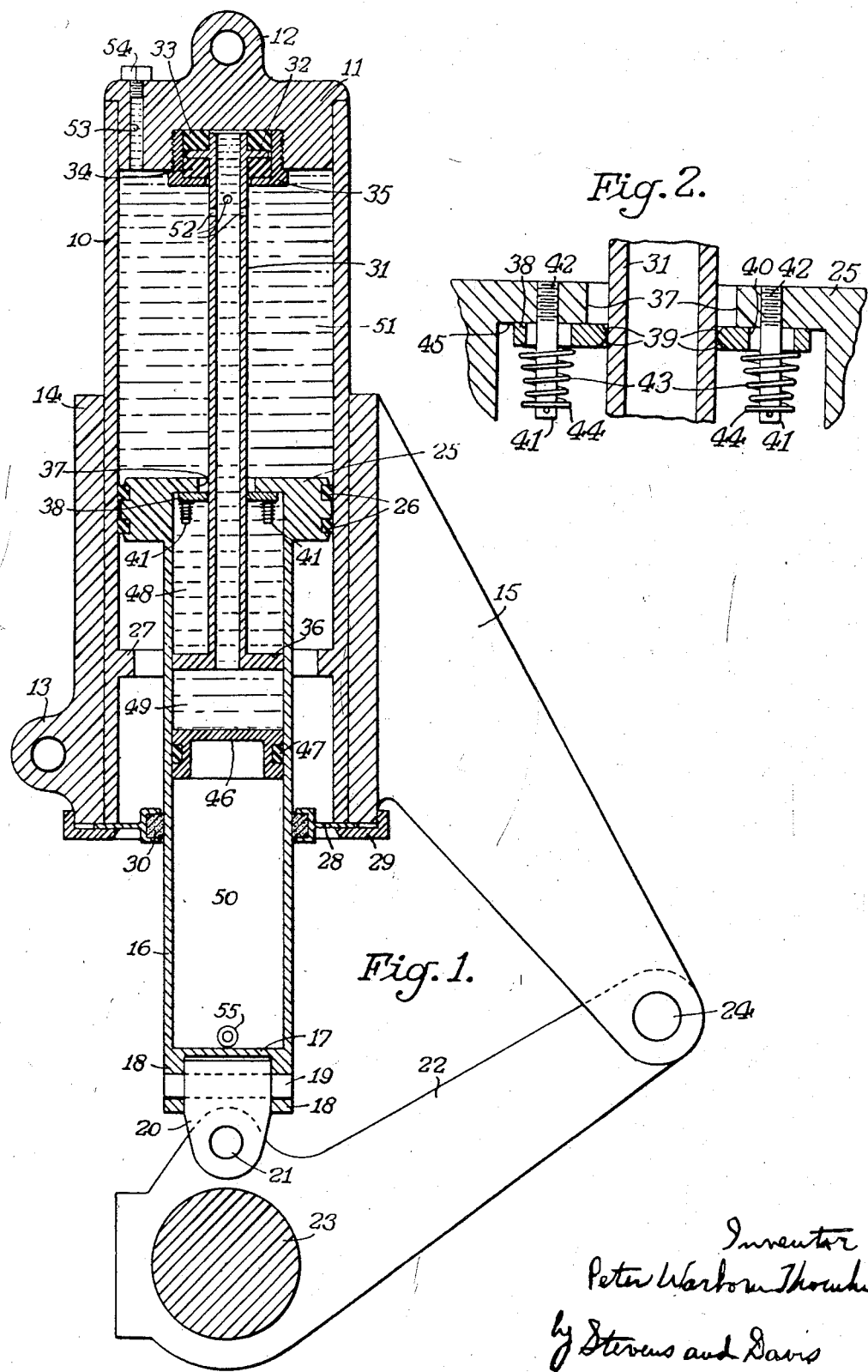

Patented May 2, 1944

2,348,160

UNITED STATES PATENT OFFICE 2,348,160

LIQUID DAMPED TELESCOPIC SHOCK ABSORBER

Peter Warborn Thornhill, Leamington Spa, England, assignor to John Henry Onions, Coventry, England Application February 25, 1943, Serial No. 477,125
In Great Britain February 20, 1942

7 Claims. (Cl. 267—64)

This invention relates to liquid damped telescopic shock absorbers, more particularly shock absorbing struts and it has for an object to provide an improved form and arrangement of damping valve device, which is adapted to damp the recoil movement of the shock absorber in a simple yet efficient manner.

It is a further object of the invention to provide an improved construction of telescopic shock absorber in which provision is made for one of the telescopic members to rock laterally within the other, thus enabling one of said members to be fixedly mounted upon a vehicle or aircraft, while the other is pivotally attached directly to an angularly movable arm by which a wheel or equivalent is carried. A shock absorber of this general form is described in our co-pending application 472,042, filed January 11, 1943.

According to the invention there is provided a liquid damped telescopic shock absorber comprising a cylinder, a hollow plunger having a piston head arranged to slide longitudinally within the cylinder, a recoil piston slidable within the plunger, a tubular stem anchoring the recoil piston to the end closure wall of the cylinder, the passage through said stem serving as a liquid connection, which extends from the cylinder to that plunger space beyond the recoil piston and which restricts the flow of liquid from the cylinder to the said plunger space when the shock absorber is being shortened, thereby damping the shortening movement, and a damping valve which is incorporated in the piston head so as to open easily and allow liquid to flow freely from the cylinder to the plunger during shortening of the shock absorber, but to close during extension of the shock absorber, thus restricting the flow of liquid from that plunger working space adjacent the piston head, back into the cylinder, and thereby damping the extending movement of the shock absorber.

Further, in a liquid damped telescopic shock absorber in which a tubular plunger member having a piston head at its inner end rocks relative to a cylinder as the piston head slides within the cylinder, a stem secured at one end to the cylinder being arranged to extend through the piston head and carry a recoil piston which slidably engages with the interior of the plunger, the present invention is characterised by the fact that the said piston head is fitted with a damping valve to allow free flow of liquid from the cylinder to the plunger but not vice versa, the stem having a longitudinal passage which forms a communication between the cylinder and the interior of the plunger at that side of the recoil piston remote from the piston head. The piston head is preferably formed with an aperture through which the stem passes with considerable clearance, to allow for lateral movement of the stem as a result of rocking of the plunger. Also the damping valve may advantageously comprise an annular valve member which is slidable longitudinally upon the stem and radially with respect to the piston head, whereby the valve member is adapted to close the relatively large aperture for the passage of the stem through the piston head, despite lateral movement of the stem relative to said piston head due to rocking of the plunger in the cylinder. Conveniently the valve member is mounted with lateral freedom upon a plurality of pins which latter carry springs arranged to press the valve member against the surface of the piston head. Further, the stem may be attached to the end wall of the cylinder by cushion means enabling the stem to move laterally within the cylinder as the plunger rocks, the end of the stem conveniently being provided with an outwardly projecting flange which is located between a pair of cushion members.

The invention is illustrated by way of example in the accompanying diagrammatic drawing, in which:

Figure 1 is a side elevation, partly in section, showing the general arrangement of a shock absorbing strut suitable for incorporation in the landing gear of an aircraft; and Figure 2 is a fragmentary sectional elevation of the damping valve drawn to an enlarged scale.

The shock absorber shown in Figures 1 and 2 comprises a tubular cylinder 10, the upper end of which is closed by a plug member 11 formed with a lug 12, by which latter the cylinder is adapted to be secured to an aircraft or vehicle body, a second fixing lug 13 being provided at the lower part of the cylinder 10 so that the latter can readily be mounted in a rigid manner. The lug 13 is formed upon a sleeve 14, which is clamped or otherwise secured around the cylinder 10 so as to constitute a support for a bracket 15. A tubular plunger 16 is arranged to move telescopically within the cylinder 10 and is formed at its lower part with an end closure wall 17 having a pair of lugs 18 perforated to receive a spindle 19 upon which a block 20 is pivotally mounted. The block 20 is drilled at right angles to the spindle 19 for the reception of a second spindle 21, by which said block is pivotally connected with an arm 22. The arm 22 serves as a mounting for the wheel or like landing member, and in the example shown the wheel axle is indicated diagrammatically at 23. The opposite end of the arm 22 is pivoted to the lower part of the bracket 15 by a pin or equivalent 24. Thus as the wheel or equivalent moves vertically, due to a landing shock or to inequalities in the surface over which the aircraft or vehicle is travelling, the arm 22 is caused to move angularly about the pin 24, thus moving the plunger member 16 telescopically up and down within the cylinder 10, this movement being accomplished by a slight lateral rocking owing to the arcuate path which is followed by the second spindle 21. The block 20, serving as the connection between the plunger member 16 and the arm 22, functions in the manner of a universal joint serving to reduce the operating friction in the various pivots, even when the wheel axle 23 is subjected to appreciable axial loads.

At its upper end the plunger member 16 is formed or provided with a somewhat barrel-shaped piston head 25, which is adapted to slide in a substantially liquid-tight manner within the cylinder 10 owing to the provision of a pair of resilient packing rings 26, the curved shape of the piston head 25 enabling the latter to tilt within the cylinder as the plunger member 16 rocks, as above described. Downward movement of the plunger member 16 is limited by a stop projection 27 formed within the cylinder 10 for engagement with the under surface of the piston head 25. Moreover an annular plate 28 is arranged to have substantial radial freedom within a housing 29, and is fitted with a packing ring 30 of felt or other soft material through which the plunger member 16 is arranged to slide; thus the plate 28 and packing ring 30 together seal the lower end of the cylinder 10 against the admission of dirt and foreign matter, at the same time permitting the plunger member 16 to slide axially, as well as rock in a radial sense, to the requisite extent.

A tubular stem 31 is disposed within the cylinder 10 and has its upper end anchored in a somewhat resilient manner to the plug 11. For this purpose the stem 31 is formed with a radial flange 32, which is disposed between a pair of annular cushion members 33 and 34 conveniently composed of soft rubber. These cushion members are located within a cavity formed in the plug 11 and are held in position by a gland nut 35, the arrangement being such that the stem 31 is adapted to swing or rock within limits relative to the axis of the cylinder 10, but is located against substantial axial movement. At its lower end the stem 31 is formed with a recoil piston 36 arranged to be a relatively close sliding fit within the plunger member 16; the periphery of the recoil damping piston 36 is of small axial width so that the piston can rock relative to the plunger member without causing binding. The piston head 25 is formed with a relatively large central aperture 37, through which the stem 31 is arranged to pass, but this aperture is normally closed by an annular plate 38 constituting a damping valve member. As will be seen more clearly from Figure 2, the internal edges of the plate 38 are chamfered, as indicated at 39, so that said plate slides with only slight clearance upon the stem 31, the clearance conveniently being that which is necessary to provide the requisite amount of damping during the extension or recoil of the shock absorber. The plate 38 is substantially smaller in diameter than the interior of the plunger member 16, and in order to allow said plate to move radially so as to compensate for rocking movements of the stem 31 relative to the piston head 25, said plate is formed with a plurality of holes 40 through which pass a plurality of pins 41 secured to the piston head 25 by means such as the screw threading indicated at 42. The holes 40 are considerably larger than the pins 41 so as to allow for the above-mentioned radial movement of the plate 38. Springs 43, which are held in position by washers 44, normally keep the plate 38 pressed against the under surface 45 of the piston head 25, although said plate is able to move downwards upon the pins 41 and thus permit the flow of damping liquid in a downward direction through the aperture 37, as will be hereinafter explained.

A floating piston 46, provided with a fluid-tight packing ring 47, is freely slidable within the plunger member 16; thus the interior of said plunger member is divided by the recoil piston 36 and floating piston 46 into three working spaces, which are indicated at 48, 49 and 50 respectively. The spaces 48 and 49 are completely filled with damping liquid, which latter also extends through the stem 31 and fills the working space 51 of the cylinder 10. A plurality of constricted apertures 52 are formed in the upper part of the stem 31 and constitute a means of communication between the plunger space 49 and the cylinder space 51. The damping liquid is, of course, inserted after assembly through a passage 53, which is closed by a screwed plug 54. The plunger space 50 is filled with compressed air or other gas, conveniently pumped in through a valve fitting indicated at 55, the pressure, of course, being arranged to suit the axial load which the shock absorber is intended to sustain.

The operation of the shock absorber is as follows. When the wheel or equivalent encounters a bump the plunger member 16 is forced upwards within the cylinder 10, the result being that the volume of the working space 51 is reduced and that of the working space 49 in the plunger tube is increased, but to a lesser extent, depending upon the relative cross-sectional areas of these two working spaces. Therefore some of the liquid from the working space 51 flows through the aperture 37, and by depressing the plate 38 is able to flow relatively freely into the working space 49. The remainder of the liquid ejected from the working space 51 is forced through the apertures 52 and then flows along the stem 31 into the working space 49. The floating piston 46 is, of course, forced downwards owing to the increase in volume of both of the working spaces 48 and 49, and the pressure of the air in the space 50 is consequently raised, as is quite well known in connection with shock absorbers of the oleo-pneumatic type to which the present invention belongs. When the end of the initial shortening stroke is reached, the pressure of the air in the working space 50 is much greater than that necessary to support the actual load on the shock absorber, and therefore the latter tends to extend to its normal length. This movement is, however, heavily and positively damped owing to the fact that the liquid which is trapped within the working space 48 can only escape at a relatively slow rate through the narrow annular passage between the interior of the plate 38 and the stem 31; during this movement liquid flowing from the working space 49 back into the working space 51 of the cylinder is only lightly damped by the apertures 52, thus ensuring that the working space 51 is maintained completely full of liquid.

The invention is of particular utility in cases where the cross-sectional area of the plunger space is substantially smaller than the effective cross-sectional area of the cylinder, the quantity of liquid thus transferred through the stem for any given telescopic movement being dependent upon this difference in area.

The invention thus provides a simple but reliable and efficient shock absorber which is easy to install, and in which the outward movement of the plunger is positively resisted by a body of trapped liquid which can escape only gradually through restricted orifices. The arrangements described are, of course, to be regarded as examples only, for various modifications may be made in the construction and design of the parts so as to suit requirements.

What I claim is:

1. A liquid damped telescopic shock absorber comprising a cylinder having an end closure wall, a hollow plunger having an apertured piston head arranged to slide longitudinally within said cylinder, a recoil piston, a tubular stem anchored to the end closure wall of said cylinder, passing through the aperture in said piston head and supporting said recoil piston within the hollow plunger for relative sliding movement, means for establishing fluid connection between the working space of said cylinder and the interior of said hollow stem adjacent the point of anchorage of the latter, the hollow stem serving as a liquid connection which extends from the cylinder to the hollow plunger at a point beyond the recoil piston, said recoil piston blocking communication from the working space of the hollow plunger beyond it and the working space of the hollow plunger between it and said piston head, a resiliently loaded floating piston in said hollow plunger acting toward said recoil piston in the working space of the hollow plunger therebeyond, and an annular damping valve mounted on said piston head and adapted to restrict liquid flow from said hollow plunger to said cylinder through the aperture in said piston head upon relative movement of the piston head and the end closure wall away from one another while permitting flow of liquid from said cylinder into said hollow plunger through said piston head upon relative movement of the latter toward the end closure wall, whereby the extending movement of the shock absorber is damped.

2. A shock absorber comprising a cylinder having a closed end adapted for attachment to one part of the load, a hollow plunger extending from the other end of said cylinder and adapted for attachment to the other part of the load, a piston head rigid with said plunger but mounted for limited universal movement in said cylinder, said piston head having an opening therein establishing communication between the interior of the plunger and the cylinder working space, a recoil piston, a tubular stem, means anchoring an end of said stem to the end closure wall of said cylinder for limited universal movement, said stem passing through the aperture in said piston head with considerable clearance and supporting the recoil piston within the hollow plunger, said tubular stem being, adjacent its anchored end, in restricted communication with the working space of said cylinder, an annular check valve controlling fluid flow through the annular space defined by the exterior of said stem and a portion of the piston head defining the aperture therein, and means mounting said valve for axial movement upon the stem and for radial movement relative to the piston head whereby the valve member is adapted to close the relatively large aperture for the passage of the stem through the piston head, despite lateral movement of the stem relative to said piston head due to rocking of the plunger in the cylinder.

3. A shock absorber as claimed in claim 2 wherein said annular valve is provided with a plurality of sub-marginal apertures and wherein the means mounting said valve comprises a plurality of pins extending from said piston head through said sub-marginal apertures, and a spring on each pin urging said annular valve into seating position against the underside of said piston head whereby upon compression of said shock absorber the valve will be opened against the thrust of the springs while upon extension thereof the springs will bias the valve to closed position.

4. A shock absorber as claimed in claim 2 wherein the means anchoring an end of said stem to the end closure wall of said cylinder comprises a pair of cushion members receiving therebetween a radial flange extending from said tubular stem.

5. A shock absorber as claimed in claim 2 wherein said stem is provided with an outwardly projecting flange at its end remote from the recoil piston and wherein the means anchoring that end of said stem to the closure wall comprises a pair of annular resilient members disposed on either side of the stem flange, and means for compressing said resilient members to support said stem for limited universal movement.

6. A shock absorber as claimed in claim 2 wherein the periphery of the recoil damping piston is axially narrow to permit rocking of the plunger relative to the piston.

7. A shock absorber as claimed in claim 2 wherein the hollow plunger is connected to the load by an arm which moves angularly about an axis fixed with respect to the cylinder.

PETER WARBORN THORNHILL.